United States Patent [19]

Bar-On et al.

[11] Patent Number: 5,371,900
[45] Date of Patent: Dec. 6, 1994

[54] STORM PLAN EXECUTION ATTACHMENTS FOR TRUNKED RADIO SYSTEM

[75] Inventors: David Bar-On, Rehovot; Leeba Salzman, Modiin; Leonard Wurtzel, Jerusalem, all of Israel

[73] Assignee: Motorola, Inc., Schaumburg, Ill.

[21] Appl. No.: 847,549

[22] Filed: Mar. 6, 1992

[30] Foreign Application Priority Data

Mar. 8, 1991 [GB] United Kingdom ................ 9104922
Aug. 9, 1991 [GB] United Kingdom ................ 9117257

[51] Int. Cl.[5] ........................ H04B 7/00; H04B 17/02
[52] U.S. Cl. .................................. 455/53.1; 455/54.1; 455/88

[58] Field of Search ................ 455/15, 16, 17, 33.1, 455/34.1, 34.2, 53.1, 54.1, 54.2, 56.1, 67.1, 88, 186.1, 185.1, 186.2; 379/57, 58, 59, 60, 63, 45, 49; 340/825.52, 825.44, 539

[56] References Cited

U.S. PATENT DOCUMENTS 5,117,501 5/1992 Childress et al. .................... 455/17

Primary Examiner—Reinhard J. Eisenzopf
Assistant Examiner—Lisa Charouel
Attorney, Agent, or Firm—Wayne J. Egan

[57] ABSTRACT

A multi-user radio system, such as a trunked radio system has sets of operations ("storm plans") for execution in emergency situations. A central control and management processor is arranged to define a list of users (20) associated with a respective storm plan and to permit the defined users to execute the respective storm plan.

6 Claims, 3 Drawing Sheets

STORM PLAN EXECUTION ATTACHMENTS FOR TRUNKED RADIO SYSTEM

BACKGROUND OF THE INVENTION

This invention relates to a multi-user radio system, such as a trunked radio system and to a set of operations, called a Storm Plan, for execution in emergency situations.

SUMMARY OF THE PRIOR ART

To allow fast reaction in emergency situations or in other predetermined situations in Trunking radio systems, Storm Plans are prepared in advance with the appropriate radio commands to be sent to the desired radios when the Storm Plan is executed. A Storm Plan contains a list of commands to be sent to the radios, and for each command, a list of radios that will receive the command when the Storm Plan is executed. For example, a command may be Regrouping radios into one Talk Group. In this case, the radios in the list will be the radios that should be able to talk with each other when the Storm Plan is executed.

Storm Plans reside and are activated from control systems, such as a Smartnet (trademark) Information Management System (SIMS). In multi-user control systems such as SIMS, it is desired that access to the Storm Plans should be limited to users that are allowed to control the radios in the Storm Plans. Currently, each user can be either attached (responsible) to a certain radio or not attached (not responsible). A user can create or activate Storm Plans that contain exclusively radios that he is attached to.

The decision as to whether a user is attached or not attached to a radio is determined by the Home Talk Group of the radio. The Home Talk Group is a Talk Group assigned as the main Talk Group of a radio. For each user, a list of Talk Groups is attached. This list determines to which of the Talk Groups the user is attached (responsible). If the radio's Home Talk Group is one of these Talk Groups, the user is considered as attached to the radio. This gives the user access permissions to the radio, such as for modifying its database record, Regrouping it, etc.

While the above attachments scheme may be enough for Storm Plan maintenance (create, change, modify) that is done in a non-emergency situation, it may not be satisfactory for Storm Plan activation. This is because in an emergency, it may be desired that users that are not responsible for certain radios in a normal situation, will nevertheless be able to activate Storm Plans with these radios. For example, it may be desired that a dispatcher from one agency will be able to activate Storm Plans that regroup radios from his agency and from another agency into one Talk Group. It is expected that in the new wide area radio systems, the requirements for such inter-agency access will increase. This invention intends to solve this problem.

For the most part in radio control systems, radio commands are executable only by the dispatcher, located at a fixed terminal. Dispatchers regroup radios into different talkgroups, inhibit radios from transmitting or receiving signals, lock radio channel selectors, and acknowledge radio transmissions such as Reprograms Requests and Emergency Alarms. In current Trunking systems, these dispatcher functions cause radio searches to be initiated. Tasks are created and the radio command is repeatedly sent to the radio, until an acknowledgement is received or until the search times out. The initiating dispatcher, seated at a terminal can monitor active tasks, restart them, and otherwise manipulate them, as needed. However, there are emergency situations where it might be desirable to execute such commands from a non-fixed position, specifically from a radio unit.

SUMMARY OF THE INVENTION

According to a first aspect of the invention, there is provided a multi-user radio system having central control and management processing means and a transmitter associated therewith and having plurality of remote radio units. The central control and management processing means comprises a database having means for defining a set of emergency commands and, in association with each command of the set, means for defining the radios to which that command is to be sent. The invention is characterised in that the database further comprises means for defining a list of users associated with the set of commands and means for providing access to the defined users for execution of the commands.

In a preferred embodiment, means are provided for enabling the defined users to view the set of commands and their associated remote radio units.

According to a second aspect of the invention there is provided a multi-user radio system having central control and management processing means and a transmitter associated therewith and having a plurality of remote radio units. The central control and management processing means comprises a database having means for defining a set of emergency commands and in association with each command of the set, means for defining the radios to which that command is to be sent. The invention is characterised in that at least one of the plurality of remote radio units comprises means for sending a command to the central control and management processing means for activation of the set of emergency commands and the central control and management processing means comprises means for receiving said command and activating the set of emergency commands in response to the command. It is preferred that the database comprises means for defining a list of remote radio units associated with the set of commands and means for providing access to only those remote radio units in the defined list for execution of the commands.

The invention in its second aspect enables a radio user in the field to activate Storm Plans without the help of the dispatcher. This might be required, for example, during a police unit operation. A unit commander can himself activate an appropriate Storm Plan immediately, based on developments in the field.

In a further feature of the second embodiment defined remote radio units can cancel a Storm Plan.

Preferred embodiments of the invention will now be described, by way of example only, with reference to the drawings.

DETAILED DESCRIPTION OF THE PREFERRED EMBODIMENTS

Figure 1:
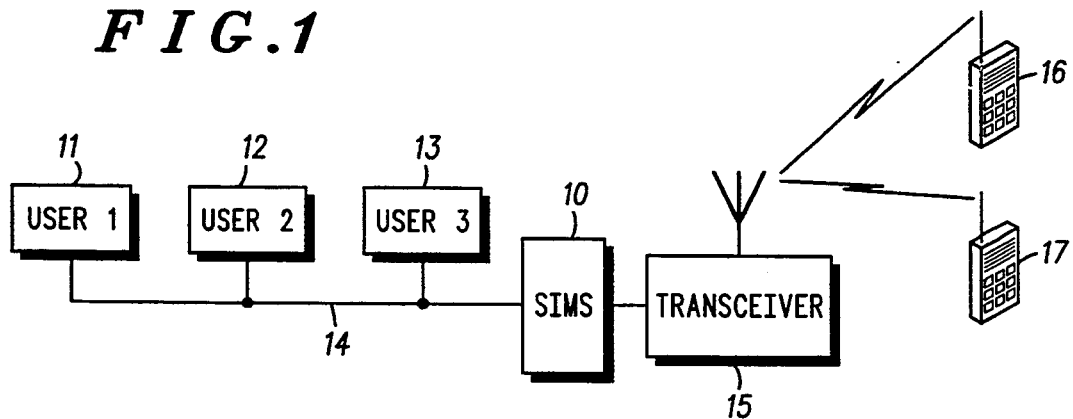
FIG. 1 shows a multi-user radio system having a central control and management processor in accordance with preferred embodiments of the invention.

Referring to FIG. 1, there is shown a multi-user trunked radio system comprising a Smartnet (trademark) information management system (SIMS) 10, to which three user terminals 11, 12 and 13 are connected by means of a communications connection (local area network, RS232, or radio interface etc.) 14. The users of the user terminals are designated as User 1, User 2 and User 3. Associated with the SIMS is a trunked radio transceiver 15, which is in radio communication with a large number of radios, of which two such radios 16 and 17 are shown in the figure.

Users 1, 2 and 3 may be separate business entities separated over a wide area. Different users can communicate with different radios in a known manner, according to the pre-defined arrangements programmed in the SIMS 10.

Figure 2:
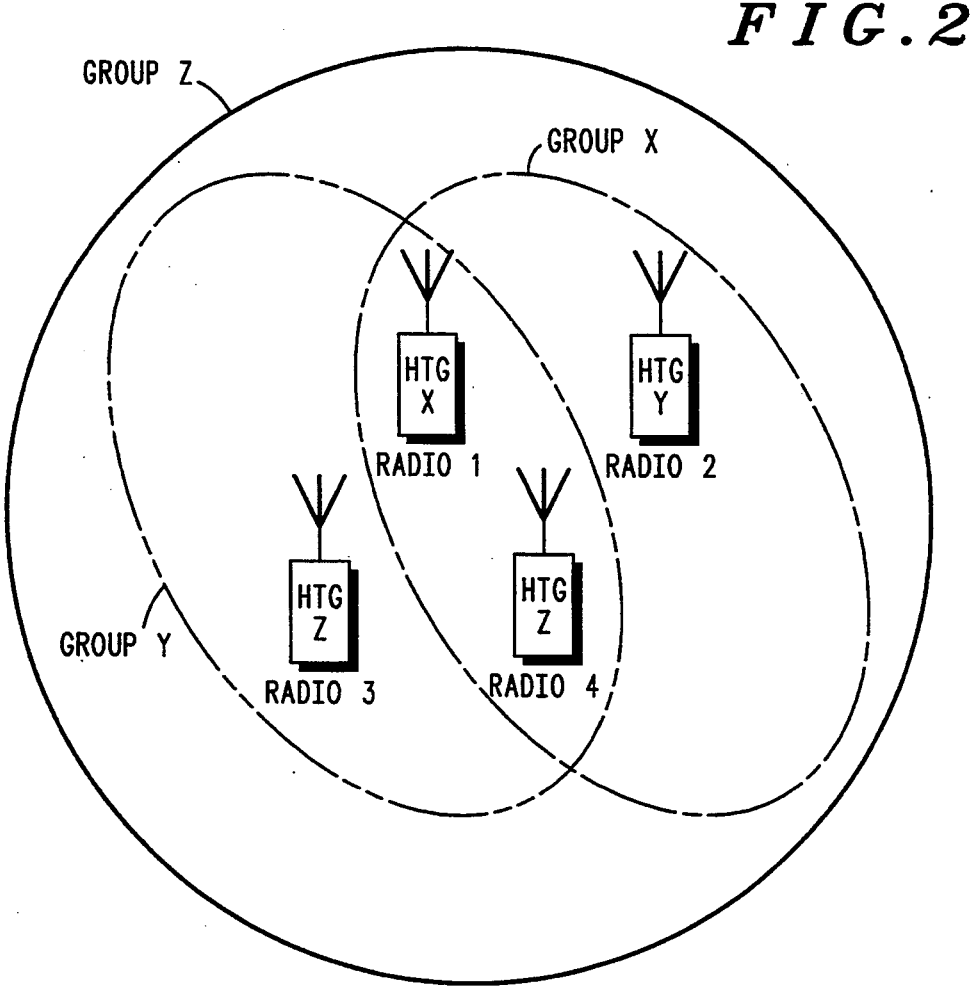
FIG. 2, shows four radios of a system such as that of FIG. 1, divided into different Talk Groups.

Referring to FIG. 2, there are shown four radios designated as Radio 1, Radio 2, Radio 3 and Radio 4. Each radio has a memory in which is programmed a number of Talk groups. One of these Talk Groups is designated the Home Talk Group. The Home Talk Group of each of the four radios is shown in FIG. 2. The Home Talk Group of Radio 1 is group X, the Home Talk Group of Radio 2 is group Y and the Home Talk Group of Radio 3 and 4 is group Z. The figure also shows which radios fall into which groups. Thus, Radios 1, 3 and 4 form group X; Radios 1, 2 and 4 form group Y; and all four radios form group Z. Clearly, in a real-life situation, the groups will be much larger and there may be more groups. For convenience here, a simple arrangement is illustrated. Each radio may be programmed with further Talk Groups, which are not illustrated.

Figure 3:
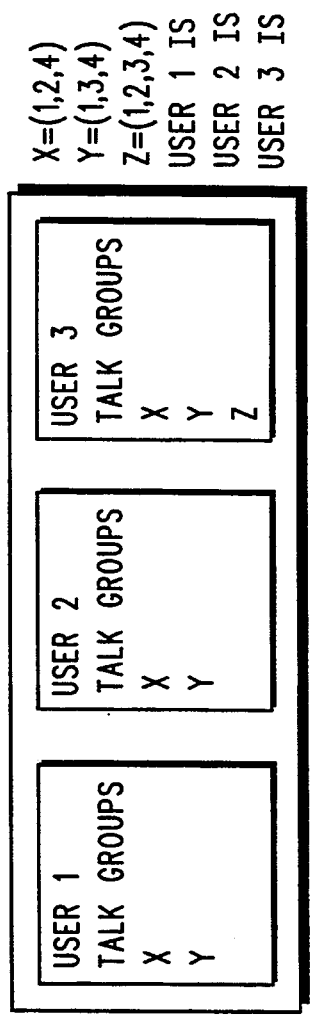
FIG. 3 shows a part of the database of the processor of FIG. 1, defining the users and their attached Talk Groups

Referring to FIG. 3, there is shown a look-up table in the database of the SIMS 10 correlating users and Talk Groups. For each user, a list of Talk Groups is attached. This list determines to which of the Talk Groups the user is attached (responsible). Thus, User 1 is attached to Talk Groups X and Y. A user is considered as attached to each radio of which the Home Talk Group is one of the Talk Groups listed in this table. Thus, User 1 is attached to Radios 1 and 2. This is set out on the right hand side of the figure. Only User 3 is attached to all the radios. Thus, only User 3 is able to modify the Storm Plan. By contrast, User 1 is not responsible for Radios 3 and 4 while User 2 is not responsible for Radios 2, 3 and 4. Users 1 and 2 are not allowed to modify the Storm Plan, because the Storm Plan affects all four radios.

Figure 4:
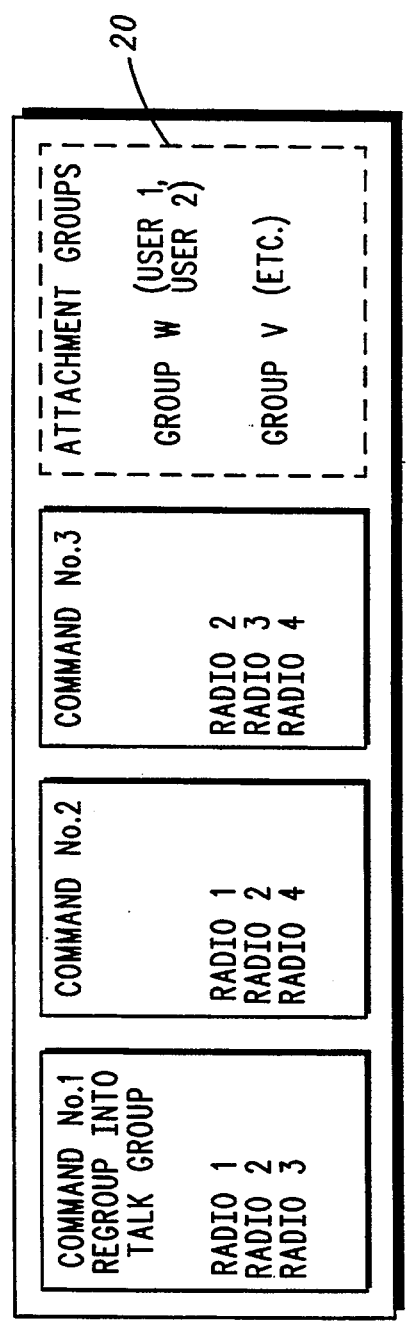
FIG. 4 shows a Storm Plan as defined in the processor of FIG. 1.

Referring to FIG. 4, the Storm Plan is set out. The Storm Plan is defined in the database of the SIMS 10. The Storm Plan lists commands and radios associated with each command. The first command is labelled Command #1. This command may, for example, be "Regroup into Talk Group". Associated with Command #1 are Radios 1, 2 and 3. As can be seen, these radios do not currently form a Talk Group. Upon execution of the Storm Plan, a command is issued by the SIMS 10 and transmitted by the transceiver 15 and received by Radios 1, 2 and 3. Those radios then execute the command to regroup themselves into a Talk Group. Further commands (Command #2 and Command #3) are defined with different associated radios. The associated radios receiving these commands will execute those commands when the Storm Plan is executed.

In accordance with the preferred embodiment of the invention, the Storm Plan also comprises an attachment group list 20, listing a number of attachment groups of users. In the example, the attachment group list comprises Group W consisting of user 1 and 2 and Group V consisting of other users (not specified here). Instead of an attachment group list, there may be a single attachment group in the Storm Plan - e.g. a list comprising users 1 and 2. The presence of User 1 in the attachment group list allows User 1 to review the Storm Plan and execute it and modify the Storm Plan under execution. To view the Storm Plan, User 1 issues a view command to the SIMS 10, and the contents of the Storm Plan are relayed along the communications connection 14 and displayed on a screen at the user terminal 11. Having checked the contents of the Storm Plan, User 1 can execute it. Similarly, User 2 can view and execute the Storm Plan. Neither User 1 nor User 2 can modify the Storm Plan. By contrast, User 3, which is already defined as being attached to all the radios, does not need to be listed in the attachment groups list and can view, modify and execute the Storm Plan.

The invention allows users that are not responsible for certain radios in a normal situation, to be able to activate Storm Plans that contain these radios in emergency situations. For this, attachment groups are defined. Each attachment group contains a list of users. A list of attachment groups is attached to each Storm Plan. Whereas in the prior art, only users that are responsible for all the radios in a Storm Plan can maintain its contents, in accordance with the invention, they will also be able to define attachment groups of the Storm Plan. A user that is one of these groups is able to activate the Storm Plan. This allows users that do not have the responsibility to decide what should be done in the emergency situation (i.e. define the Storm Plan contents) to activate the Storm Plan in emergency situations.

While only users that are attached to all the radios in the Storm Plan are able to modify them, execution of the Storm Plan is also permitted to users in the attachment groups list. These users will also be able to control the Storm Plan when it is active (suspend, edit, etc.).

The users in the attachment groups are also able to read the Storm Plan, in order to check his contents before activating it.

The attachment groups maintenance is done by the SIMS System Manager, or by a user with similar responsibility in other control systems.

In the prior art, a user can read, modify or execute a Storm Plan only if he is attached to all the radios in the Storm Plan. While there is a difference between modification privileges and activation privileges, no special privileges can be given for activation in emergency situations. This invention overcomes this limitation.

In order to allow remote activation of a Storm Plan, in accordance with the second aspect of the invention, new inbound signalling word and outbound signalling word (ISW/OSW) pairs are added for Storm Plan activation, Storm Plan cancel, Storm Plan activation acknowledge and Storm Plan cancel acknowledge, in a similar manner to existing emergency alarm commands.

Figure 5:
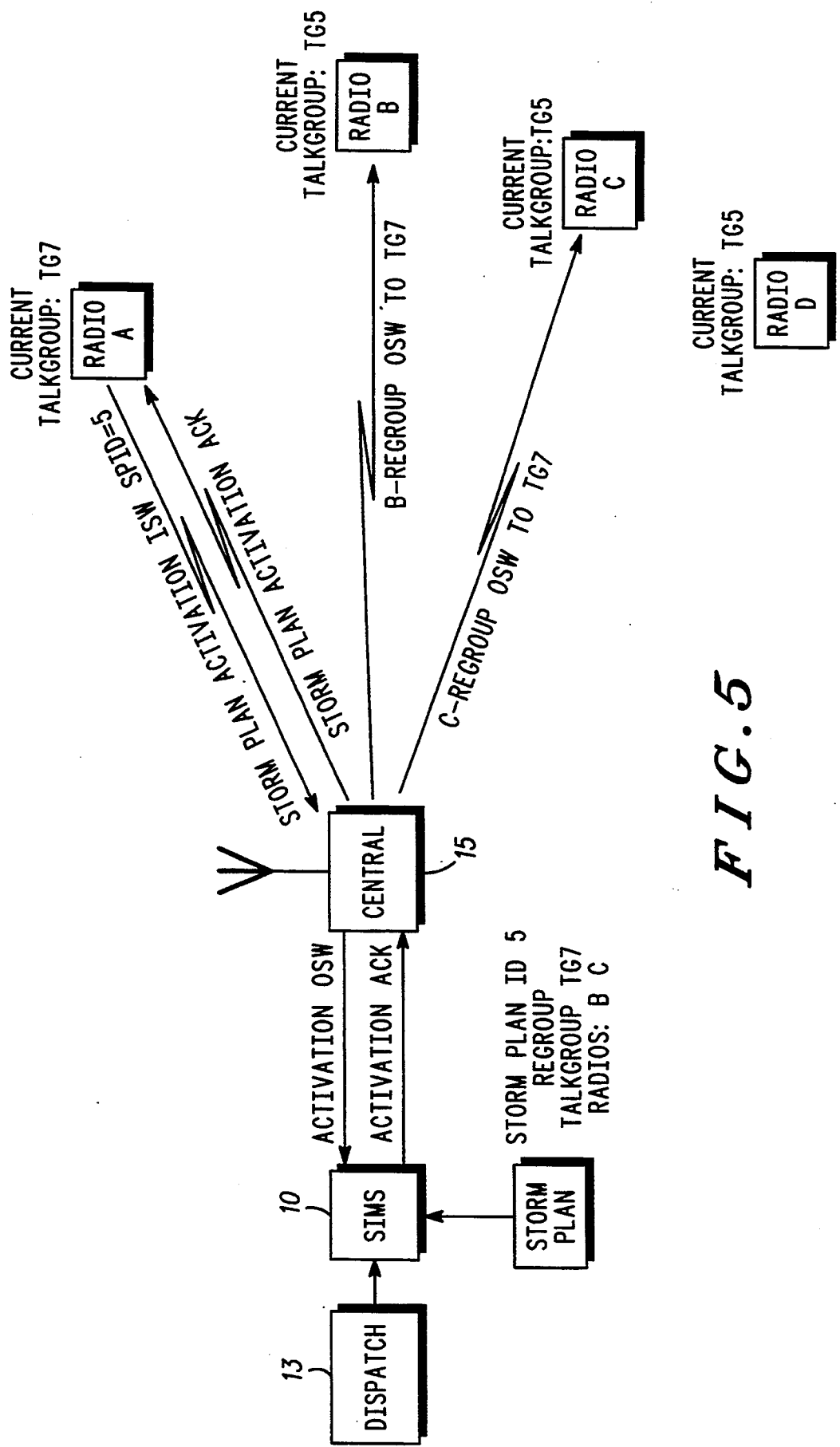
FIG. 5 shows a multi-user radio system having a central control and management processor and shows exchanges of commands in accordance with the second embodiment of the invention.

A system in accordance with the second embodiment of the invention is described in FIG. 5, in which units shown in FIG. 1 have the same reference numerals. In the system in FIG. 5, there is shown 4 radios labelled radio A, radio B, radio C and radio D.

The activation ISW/OSW includes the following information: radio ID; Storm Plan ID.

Upon a radio subscribers request, the radio sends the activation ISW. The activation OSW is received by the SIMS 10 to be validated. If the request is indeed valid, the Storm Plan is activated. The SIMS 10 then sends the ACK ISW to indicated that the Storm Plan has started successfully. Storm Plan cancel can be performed in a similar manner.

Validation of the activation request by the SIMS 10 is 2-phased. First the Storm Plan ID in the request is validated. The Storm Plan ID is a unique number assigned to the Storm Plan and stored in the SIMS database with the Storm Plan at the time of its creation.

If the Storm Plan exists, the SIMS 10 ascertains whether the radio (user) has permission to activate the Storm Plan. This is the case if the radio ID is included in the Storm Plans execution attachments list, in a manner similar to that described above with reference to the inclusion of user terminal IDs in execution attachment lists.

Once the Storm Plan activation request has been validated, the SIMS 10 activates the Storm Plan sending the specified radio commands to the specified radios. The acknowledge command ACK is then sent to the radio, where it is displayed to the radio user. The activation acknowledge ISW/OSW includes: radio ID, Storm Plan ID, status.

In the event that the Storm Plan has been successfully started, the dispatcher receives the acknowledgements from the tasks created and maintains the tasks, re-starting them as necessary, in the same way as for Storm Plan activation by a terminal user. The results can then be reported to the radio user.

For a more efficient implementation of remote Storm Plan activation, a pre-programmed Storm Plan can be used as follows. At some point prior to activation, the radios listed in the Storm Plan are sent the following Storm Plan pre-program request: radio ID, Storm Plan ID, radio command.

When the request for remote Storm Plan activation has been validated, a single activation OSW, containing the Storm Plan ID, is sent periodically by the central 15, in a similar manner to existing patch OSWs and all specified radios tuned into the control channel are immediately and simultaneously instructed to perform the radio command from the pre-programmed request. In this method, a radio user understands a successful acknowledgement (ACK) to a Remote Storm Plan Activation command to mean that all relevant active radios in the area have received the command. Remote Storm Plan activation is thus quicker and more reliable.

In the FIG. 5 arrangement, a dispatcher stores a Storm Plan in the SIMS database 10 with Storm Plan ID 5, which requests a re-grouped command to Talkgroup TG7 for radios B and C. When the subscriber holding Radio A sends an Activation ISW to the central, the activation OSW is sent to SIMS. SIMS will validate that Storm Plan ID 5 exists, and that Radio A is empowered to activate it. If both are the case, SIMS sends a Storm Plan activation ACK to Radio A to show that the Storm Plan was started successfully, and the regroup command to the central. This causes Radios B and C (if they are active and listening to the control channel) to regroup to TG7.

The invention overcomes the problem that in an emergency situation, valuable time can be lost while a radio subscriber in the field contacts the dispatcher and notifies him of the need to activate a Storm Plan. In addition, there may be emergency situations where a subscriber must be silent and cannot make an oral request to the dispatcher. Remote Storm Plan activation overcomes these problems by enabling the subscriber himself to activate the necessary Storm Plan (and radio commands) in real time. This provides greater flexibility and functionality to commanders in the field.

We claim:

1. A multi-user radio system comprising control and management processing means, a transmitter associated therewith and a plurality of remote radio units, the control and management processing means comprising a database having means for defining sets of emergency commands and, in association with each command of each set, means for defining the radio units to which that command is to be sent, wherein the database further comprises means for defining respective lists of users associated with respective sets of commands and the control and management processing means comprises means for permitting a user of a respective list of users to execute a respective set of commands.

2. A system according to claim 1 comprising a plurality of user control terminals connected to the control and management processing means, wherein each user control terminal is provided with an identification number and wherein the list of the users comprises a list of identification numbers of the user control terminals.

3. A system according to claim 1, wherein each remote radio unit is provided with an identification number and wherein the list of users comprises a list of identification numbers of the remote radio units.

4. A system according to claim 1, wherein the control and management processing means comprises means for providing the user of the respective list of users with access to the respective set of commands in the data base for reading the commands.

5. A system according to claim 1, wherein the control and management processing means comprises means for permitting the user of the respective set of users to suspend the respective set of commands when the respective set of commands has been initiated and is in operation.

6. A system according to claim 1, wherein the central control and management processing means comprises means for permitting changes to the commands by the user of the respective set of users when the respective set of commands has been initiated and is in operation.

* * * * *